Dec. 17, 1963     G. H. FATHAUER ETAL     3,114,859
TRACKING ERROR MEASURING DEVICE
Filed Dec. 11, 1958     2 Sheets-Sheet 1
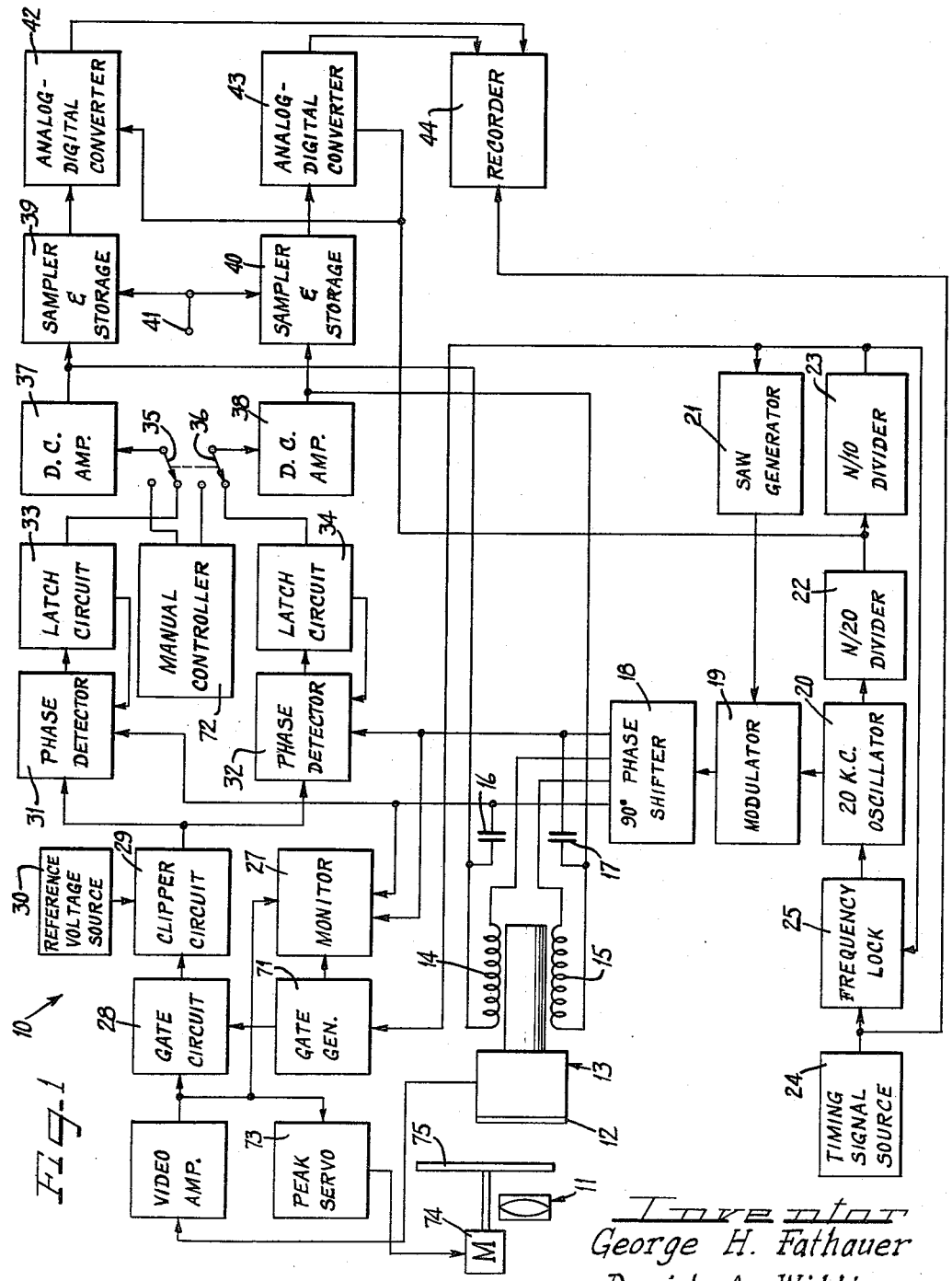
Inventor
George H. Fathauer
David A. Williams
Attys

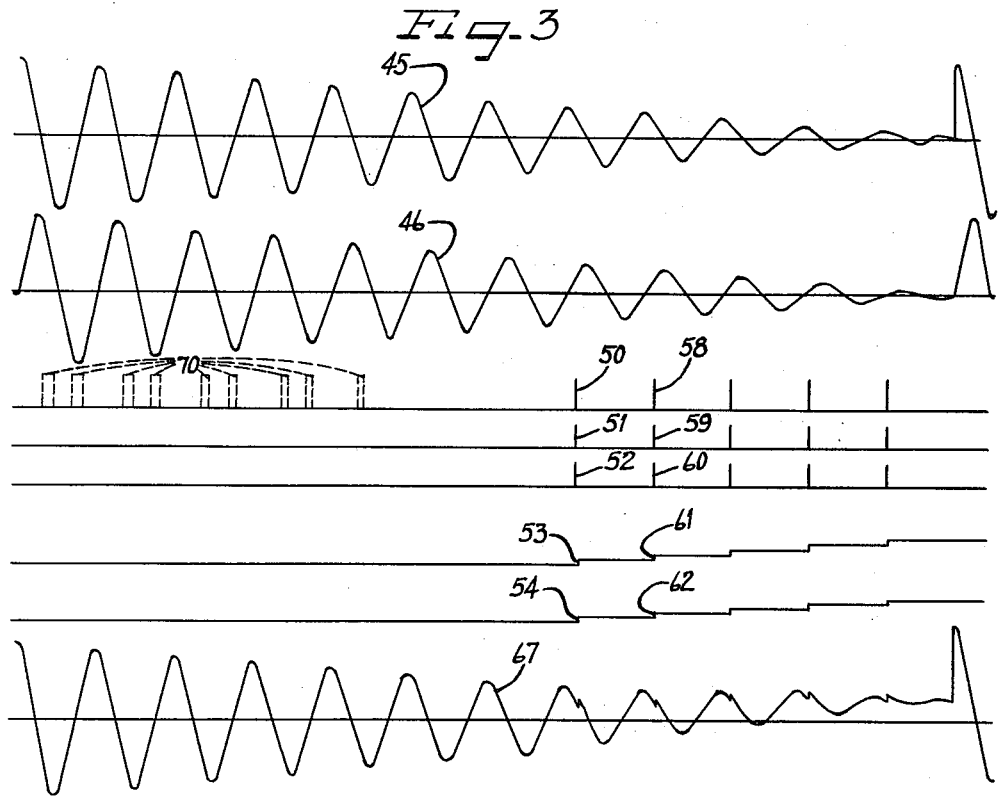
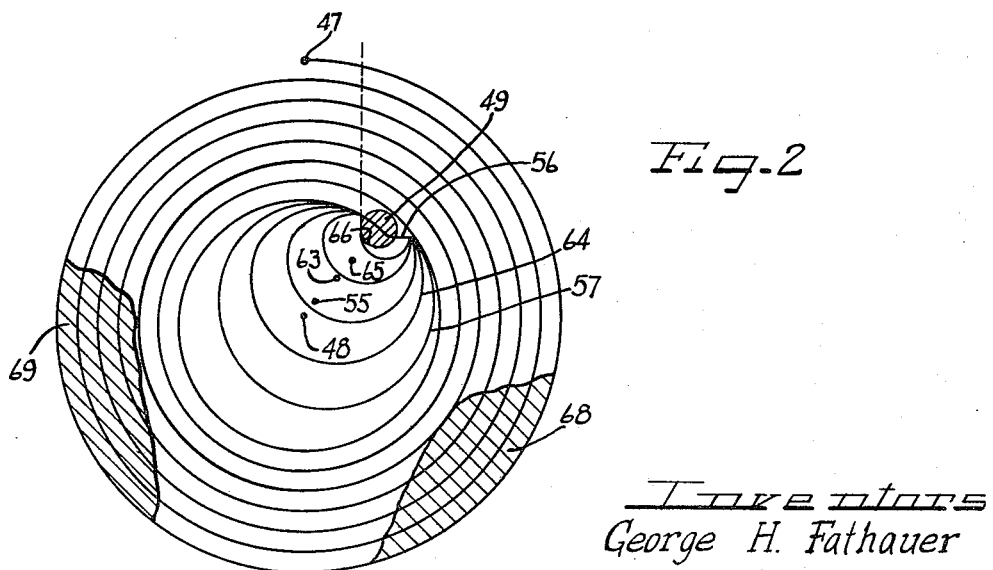

United States Patent Office 3,114,859
Patented Dec. 17, 1963

3,114,859
TRACKING ERROR MEASURING DEVICE
George H. Fathauer and David A. Williams, Decatur, Ill., assignors, by mesne assignments, to Harvey-Wells Corporation, Framingham, Mass., a corporation of New Jersey
Filed Dec. 11, 1958, Ser. No. 779,695
6 Claims. (Cl. 315—24)

This invention relates to a device for operating in conjunction with an optical system to produce electrical signals representing the location of an object in relation to an axis of the optical system, the device being particularly designed for use in tracking missiles to obtain data as to the position and path of travel thereof.

Various systems have heretofore been used or proposed for the determination of the location of objects such as missiles. Such systems have had certain disadvantages and certain limitations. Pulsed radar tracking encounters an inherent lag of angular position, lack of smoothness in following and angular accuracy limitations due to finite beam widths. Such errors in measurement may be considered to describe the instantaneous position of the target object as an area rather than a point, the true position being somewhere within the area.

Optical tracking instruments involve similar sources of error plus the factor of human skill. Photographic film may be used in conjunction with optical tracking instruments to record information, frame by frame, with reference information being recorded on the film to identify the exact time when each frame is exposed. Such an arrangement requires processing of the film, which must then be examined to determine any errors in tracking, assuming of course that conditions at the time of exposure were such as to allow favorable contrast and definition.

It is a primary object of this invention to provide an improved system for rapidly, accurately and reliably producing electrical signals representing the position of an object.

A system using the principles of this invention utilizes a television camera tube with a lens assembly for focusing upon the screen of the tube a scene including an image of an object, such as a missile. The screen is scanned by means of the cathode ray beam of the camera tube to produce a short duration signal from the object image and from the time relation of the short duration signal to the operation of the scanning means, it is possible to determine the location of the object image on the screen of the tube, and hence the position of the object relative to the axis of the lens assembly.

With this system, it is possible to rapidly obtain electrical signals representing the position of the object. It is also possible to use a television picture tube as a monitor to make certain that the image of the object appears in the scene focused on the screen of the camera tube, and that there is sufficient contrast between the object image and the remainder of the scene.

With respect to the method of scanning, conventional television scanning techniques could be used, with the target being located by counting the number of horizontal lines to determine the vertical or elevation coordinate and by measuring the time delay on the target signal as compared to the sweep time of one horizontal scanning line to determine the azimuth coordinate. However, this would necessitate extreme linearity of the camera sweeps in that their amplitudes and especially their centering be quite stable.

A further disadvantage of using conventional television scanning techniques lies in the fact that the time interval between consecutive times when the object's position is sampled is equal to the time required to completely scan the scene, which is of considerable magnitude. Depending on the relative position of the target, the time interval between target detection and scan completion could vary from 0 to nearly one scanning period, which would amount to an error in the case of moving targets. However, using the methods of this invention the target's position is always measured coincidentally with the completion of a scanning cycle.

It might also be possible to use a broad defocused scanning beam which rotates in a circular path. Higher sampling rates could be obtained by this method using sweep frequencies obtainable in practice. The broad beam would however tend to dilute the target signal, causing an effective reduction in sensitivity. Also, a smearing or blending of the edges of the target image would result, which would increase the contrast ratio required.

According to an important feature of this invention, a spiral scanning system is used in which the scanning pattern is a spiral starting at the outer edge of the scene and proceeding to the center. This system greatly facilitates the procurement of accurate indications of the position of the object image.

The spiral can also make it possible to obtain indications with much greater rapidity. In particular, the scanning beam starts at the outer edge of the scene and traces out a decreasing spiral until the beam strikes the object image. At this time, a signal is applied to the scanning system to automatically shift the center of the spiral toward the object image, the distance moved being equal to the spacing of the consecutive lines of the spiral. On the next revolution, the beam again strikes the object image and the spiral center is again shifted in the direction of the object image. This is repetitive and the position of the object image is sampled at a rate equal to the rate of rotation of the beam. At the completion of each spiral, its center and the target coincide and the next spiral is then started. However, no correcting movements of the spiral center will be necessary unless the object image has moved. If the object image has moved the spiral will again shrink about it until again the position of the object image and the center of the spiral coincide.

The spiral scan also allows the automatic centering atcion to be limited to images which lie within a given radius of the center of the spiral, so that objects may be more easily tracked through a cluttered field.

This invention contemplates other and more specific objects, features and advantages which will become more fully apparent from the following details and description taken in conjunction with the accompanying drawings which illustrate a preferred embodiment and in which:

FIGURE 1 is a schematic electrical diagram of a tracking error measuring system constructed according to the principles of this invention;

FIGURE 2 is a diagrammatic view showing the operation of the spiral sweep of the system of FIGURE 1; and FIGURE 3 is a diagrammatic view showing wave forms at various points in the system, obtained with the operation illustrated diagrammatically in FIGURE 2.

Reference number 10 generally designates a tracking error measuring system constructed according to the principles of this invention, and particularly designed for the tracking of missiles.

The system 10 comprises a lens assembly 11 arranged to focus a scene containing the image of a missile or other object on the screen 12 of a television camera tube 13, which is preferably an image orthicon type of tube. The television camera tube 13, together with the lens assembly 11, may be arranged to be aimed toward a missile or other target, and the system of this invention produces electrical signals representing the deviation of the target image from the central axis of the lens assembly 11 and camera tube 13.

According to this invention, the beam of the camera tube 13 is caused to scan the screen 12 in a spiral path, starting at the outside edge of the screen and moving inwardly toward the center. In particular, the camera tube 13 has horizontal and vertical deflection coils 14 and 15, respectively connected through capacitors 16 and 17 to the output of a phase shifter 18, connected through a modulator 19 to a 20 kc. oscillator 20. The phase shifter 18 supplies 20 kc. signals to the deflection coils 14 and 15 that are 90° out of phase relative to each other, thus to cause the beam to move in a circular path about the axis of the tube 13.

The amplitude of the signals are gradually decreased at a linear rate, thus to cause the beam to trace the spiral path. For this purpose, a sawtooth generator 21 supplies a 100 cycle signal to the modulator 19. Preferably, the 20 kc. oscillator 20 is connected through a divide-by-20 divider 22 and thence through a divide-by-10 divider 23 to the sawtooth wave generator 21, thus to synchronize the operation of the generator 21 with the oscillator 20.

The system is designed for the operation in conjunction with other equipment such as cameras and the like, which may be controlled from a main 100 cycle timing signal source 24. To synchronize the operation of oscillator 20 and generator 21 with the timing signal source 24, signals from the divider 23 and the source 24 are fed to a frequency lock or comparison circuit 25 to develop an error signal which is fed to the oscillator 20 in a manner to maintain the proper frequency of operation of oscillator 20.

The video output from the camera tube 13 is fed to a video amplifier 26, the output of which is fed to a monitor 27. The monitor 27 comprises a television picture tube having deflection coils which are connected to the outputs of the phase shifter 18, thus to permit instantaneous viewing of the scene focused on the screen 12, and to permit checking of the operation of the camera tube, the sweep circuits and the video amplifier.

The output of the video amplifier 26 is also fed through a gate circuit 28 to a clipper circuit 29. The gate circuit 28 functions to pass only a selected portion of the video signal, to eliminate undesired signals from clouds or other objects, and the operation thereof will be described in detail hereinafter. The clipper circuit 29 functions to limit the amplitude of pulses derived from passage of the beam over the target image to a constant value. This value is determined by an adjustable reference voltage source 30 connected to the clipper circuit 29.

The output of the clipper circuit 29 is fed to a pair of phase detectors 31 and 32 which are respectively supplied with signals in 90° phase relation from the phase shifter 18.

In response to a pulse from the clipper circuit 29, the phase detectors 31 and 32 develop pulses which are respectively dependent upon the output from the phase shifter 18 at that time. The output pulses from the phase detectors 31 and 32 may be of either positive or negative polarity, dependent upon the relative phases of the signals from the phase shifter 18 at the time when the pulse is applied from the clipper circuit 29, and are hence dependent upon the vertical and horizontal displacement of the target image from the center of the camera tube screen 12.

The outputs of the phase detectors 31 and 32 are respectively applied to latch circuits 33 and 34, the function of which is to create D.C. voltages which are representative of the sum of the pulses which have been received. As will be described more in detail hereinafter, once the target has been located the output of voltages of the latch circuits 33 and 34 will be constant and will be respectively dependent upon the vertical and horizontal displacements of the target image from the center of the camera tube screen 12.

The outputs of the latch circuits 33 and 34 may be fed through switch contacts 35 and 36 to the inputs of D.C. amplifiers 37 and 38. The outputs of the amplifiers 37 and 38 are fed to sampler and storage circuits 39 and 40 which respond to the outputs of the amplifiers 37 and 38 at predetermined times to develop outputs proportional to the outputs of amplifiers 37 and 38 at such times, and also function to retain or store such outputs. The time of operation of circuits 39 and 40 may be determined by application of pulses thereto from an input terminal 41, which may be connected to a movie camera used in the overall system, to synchronize the operation of circuits 39 and 40 with the camera shutter. The pulses applied to terminal 41 may have a repetition rate of 10 per second, or some other sub-multiple of the rate of operation of generator 21.

The outputs of the sampler and storage circuits 39 and 40 are fed to analog-digital converters 42 and 43, the outputs of which are fed to a recorder 44, which may also be connected to the timing signal source 24. The converters 42 and 43 are driven by a 1 kc. signal from the output of the divider 22.

The recorder 44 may be an oscillograph or magnetic tape recorder, functioning to record timing signals from the source 24 and digital signals showing the vertical and horizontal deviation of the target image from the center of the camera tube screen 12. It will be appreciated that output signals from the system may also be used for automatic control purposes.

In addition to being applied to the converting and recording system, the outputs of the D.C. amplifiers 37 and 38 are applied in circuit with the deflection coils 14 and 15. With this arrangement, the center of the spiral scan is caused to shift toward the target image to thus cause the spiral scan to position itself about the target image.

This operation is illustrated in FIGURES 2 and 3, FIGURE 2 being a diagrammatic illustration of the path of travel of the scanning beam on the screen 12, and FIGURE 3 being a graphical illustration of the form of signals at various points of the circuit, when obtaining the pattern illustrated in FIGURE 2.

Reference numerals 45 and 46 indicate wave forms produced at the outputs of the phase shifter 18, which are applied through the capacitors 16 and 17 to the deflection coils 14 and 15. It will be noted that these signals are of generally sinusoidal form, are 90° out of phase relative to each other, and are of decreasing amplitude. The application of such signals to the deflection coils 14 and 15 may cause the beam to start at a point 47 as illustrated in FIGURE 2 and move about a center 48 with a radius of constantly decreasing amplitude. At a time shortly after the seventh complete revolution, the beam may move across a target image indicated by reference numeral 49 in FIGURE 2. A video signal is then produced which, after passing through the clipper circuit 29, is in the form of a pulse as indicated by reference numeral 50 in FIGURE 3. This pulse is applied to the phase detector circuits 31 and 32 to produce pulses respectively proportional to the amplitudes of the signals then applied to the phase detectors 31 and 32 from the phase shifter 18, such pulses being indicated by reference numerals 51 and 52.

When pulses 51 and 52 are applied to the latch circuits 33 and 34, a change in the D.C. level of the output thereof will be produced, to produce steps in the levels of the outputs of D.C. amplifiers 37 and 38, such steps being indicated by reference numerals 53 and 54 in FIGURE 3.

The steps 53 and 54 are applied in the circuits of deflection coils 14 and 15, to cause a shift in the center of the spiral scan to a point 55 as indicated in FIGURE 2, and to cause the beam to move radially outwardly along a path 56.

The beam then moves in a spiral path as indicated by reference numeral 57 in FIGURE 2, in such fashion as to again move across the target image 49 on the next revolution. Another pulse 58 is then produced at the output of the clipper circuit 29, to produce pulses 59 and 60 at the outputs of the phase detector circuits 31 and 32. Pulses 59 and 60 cause steps 61 and 62 in the outputs of the D.C. amplifiers 37 and 38, which are applied in circuit with the deflection coils 14 and 15, to cause the center of the scan to shift from the point 55 to a point 63 and cause the beam to again move outwardly in the path 56. The beam then travels in a spiral path as indicated by reference numeral 64 such that on the next revolution it again moves across the target image 49.

This operation continues with the center of the spiral being shifted to a point 65, then to a point 66 and finally to a point on the target 49 with succeeding revolutions of the beam the outputs of the circuits being as illustrated in FIGURE 3.

At the end of this operation, the outputs of the D.C. amplifiers 37 and 38 accurately reflect the position of the target image 49. A new cycle of operation is then initiated, with a spiral scan starting about the target image 49. If the position of the target image 49 should remain the same, no video signals will be produced, and the outputs of the latch circuits 33 and 34 and the D.C. amplifiers 37 and 38 will remain the same. However, if the position of the target image 49 should shift, the operation as above described will be repeated, to cause the scan to automatically position itself about the target image.

Reference numeral 67 in FIGURE 3 designates the wave form of the signal applied to deflection coil 14, a signal of similar form being applied to coil 15. It should also be noted that the outputs of latch circuits 33 and 34 are fed back to the phase detectors 31 and 32, to stabilize the operation of the circuits.

Each of the latch circuits 33 and 34 may be of any form which will function as above described. For example, each latch circuit may comprise a capacitor connected between the plates of a pair of triodes the plates being connected through resistors and diodes to the positive terminal of a direct current source having a negative terminal connected to the cathodes of the triodes, and to the positive terminal bias source having a negative terminal connected through resistors to the grids, to bias the tubes to cut-off. With this arrangement, the input signal may be applied between the grids and when it is of one polarity, one triode will conduct to change the charge of the capacitor in one direction in proportion to the amplitude of the pulse, and when the input signal is of the reverse polarity, the charge of the capacitor will be changed in the reverse direction. Thus in such a circuit, the output signal is taken across the capacitor.

Referring again to FIGURE 2, it is often times the case that there will be clouds or other objects in the vicinity of the target, to produce images such as indicated by reference numerals 68 and 69. Such objects may produce video signals as shown in dotted lines and indicated by reference numeral 70 in FIGURE 3. Such signals, of course, will cause improper functioning of the circuit. According to this invention, means are provided for causing transmission of the video signal through the gate circuit 28 to the clipper circuit 29 only during a selected portion of the scan, to thus eliminate video signals from false targets. This is accomplished by means of a gate generator 71, preferably in the form of a multi-vibrator, which is controlled from the output of the divider 23 to be rendered operative at the start of each scanning operation and to then cause the gate circuit 28 to be inoperative to transmit the video signal. After the elapse of a certain time interval, as determined by adjustment of the gate generator 71, the gate circuit 28 is again rendered operative to transmit the video signal. Accordingly, the portion of the video signal which is passed by the gate circuit 28 is formed only of information contained in the center portion of the scan, to eliminate the effects of images around the outer portion of the scan, such as the images 68 and 69 shown in FIGURE 2.

Another feature of the system is the provision of a manual controller 72 which generates two D.C. voltages, the amplitudes of which may be controlled through movement of a "joy stick" or the like. For example, the values of the voltages may be determined by the position of two potentiometers connected by a mechanical linkage to a manual control stick. By actuation of the switch contacts 35 and 36, such voltages may be applied to the D.C. amplifiers 37 and 38, in place of the voltages from the latch circuits 33 and 34.

Normal targets do not require manual operation, but if target visibility conditions are unfavorable, the operator who is watching the monitor may manually position the spiral to fall approximately over the target when the operation is commenced, and then switch to automatic.

At the same time, the duration of the control gate from the gate generator 71 may be adjusted for maximum rejection of undesired targets. In this connection, it should be noted that an output from the gate generator 71 is applied to the monitor 27 in a manner to reduce brightness in the portion of the reproduced image corresponding to non-transmission of the video signal by the gate circuit 28. Thus the operator is able to observe the automatic operation of the system, and is able to see the reproduced images of other objects in the vicinity of the target, so as to be able to adjust the size of the operative portion of the scan for best operation.

A further feature of the system is the provision of a peak servo 73 responsive to the output of the video amplifier 26 to control a motor 74 connected to a variable density wedge 75 interposed between the lens assembly 11 and the camera tube 13. The peak servo unit 73 operates to move the wedge 75 in a manner such that the brightest elements of the picture are always of a constant amplitude. This arrangement thus assists the clipper circuit 29 in insuring application of constant amplitude pulses to the phase detectors 31 and 32. It also provides an automatic exposure control which protects the camera tube when it is pointed at extremely bright objects, such as the sun.

It should be noted that the rotational rate of 20 kc. in the scanning rate of 100 c.p.s as previously mentioned, are intended only as illustrative, and should not be construed as limitations. In this connection, it is noted that the illustration of FIGURES 2 and 3 assumes a ratio of only 12 to 1 between the rotational rate and the scanning rate, such being chosen to simplify and clarify the illustration of the operation. It should further be noted that the concentration of the scanning lines in the center region of the spiral might be increased to provide even greater detail resolution in this area. For example, instead of having the spiral sides shrink at a linear rate, a somewhat curved sawtooth could be employed which would cause the spiral to shrink rapidly at the edges and shrink more slowly as it approached the center. A similar effect might be produced by using a linear sawtooth and to increase the rate of rotation of the spiral as it approached the center.

It will be understood that other modifications and variations may be effected without departing from the spirit and scope of the novel concepts of this invention.

We claim as our invention:

1. In a system for determining the position of an object, a television camera tube having a screen, means for impinging a cathode ray beam on said screen, means for developing a video signal dependent in amplitude on the light intensity of the spot impinged by the beam, and a pair of deflection means for controlling movement of said beam in transverse directions, means for focusing upon said screen a scene to include an image of the object, means for developing an A.C. signal, a phase shifter means responsive to said signal and connected to said deflection means to apply signals in 90° phase relation thereto, means for periodically changing the amplitude of said A.C. signal gradually from one value to another, thereby to cause said beam to move in the spiral path over said screen, and a pair of phase detector means responsive to said video signal and respectively responsive to said signals in 90° phase relation from said phase shifter means to develop a pair of signals respectively indicating position in mutually perpendicular directions in response to a short-duration video signal caused by movement of the beam over an object image.

2. In a system for determining the position of an object, a television camera tube having a screen, means for impinging a cathode ray beam on said screen and means for developing the video signal dependent in amplitude on the light intensity of the spot impinged by the beam, means for focusing upon said screen a scene to include an image of the object, scanning means for effecting scanning movement of said beam over said screen in the spiral path, phase detector means responsive to said video signal and a signal from said scanning means to develop a position-indicating signal in response to a short-duration video signal caused by movement of the beam over an object image, and means responsive to said position-indicating signal for applying a signal to said scanning means to shift the center of the spiral toward the object image.

3. In a system for determining the position of an object, a television camera tube having a screen, means for impinging a cathode ray beam on said screen, means for developing a video signal dependent in amplitude on the light intensity of the spot impinged by the beam, and a pair of deflection means for controlling movement of said beam in transverse directions, means for focusing upon said screen a scene to include an image of the object, means for developing an A.C. signal, a phase shifter means responsive to said signal and connected to said deflection means to apply signals in 90° phase relation thereto, means for periodically changing the amplitude of said A.C. signal gradually from one value to another, thereby to cause said beam to move in the spiral path over said screen, a pair of phase detector means responsive to said video signal and to the outputs of said phase shifter means to develop a pair of position-indicating signals in response to a short-duration video signal caused by movement of the beam over an object image, and means responsive to said position-indicating signals for applying signals to said deflection means to shift the center of the spiral toward the object image.

4. In a system for determining the position of an object, a television camera tube having a screen, means for impinging a cathode ray beam on said screen, and means for developing a video signal dependent in amplitude on the light intensity of the spot impinged by the beam, means for focusing upon said screen a scene to include an image of the object, scanning means for periodically effecting movement of said beam over said screen in a spiral path, phase detector means responsive to said video signal and a signal from said scanning means to develop a position-indicating signal in response to a short-duration video signal caused by movement of the beam over an object image, and signal-gating means between said camera tube and said phase detector means and operated in synchronism with said scanning means for preventing transmission of the video signal only during a selected portion of the spiral scan.

5. In a system for determining the position of an object, a television camera tube having a screen, means for impinging a cathode ray beam on said screen, and means for developing a video signal dependent in amplitude on the light intensity of the spot impinged by the beam, means for focusing upon said screen a scene to include an image of the object, scanning means for periodically effecting scanning movement of said beam over said screen in a spiral path, phase detector means responsive to said video signal and a signal from said scanning means to develop a position-indicating signal in response to the short-duration video signal caused by the movement of the beam over an object image, and latch circuit means for producing and maintaining an output signal proportional to said position-indicating signal until another position-indicating signal is developed of different amplitude.

6. In a system for determining the position of an object, a television camera tube having a screen, means for impinging a cathode ray beam on said screen, and means for developing a video signal dependent in amplitude on the light intensity of the spot impinged by the beam, means for focusing upon said screen a scene to include an image of the object, scanning means for periodically effecting scanning movement of said beam over said screen in a spiral path, phase detector means responsive to said video signal and a signal from said scanning means to develop a position-indicating signal in response to a short-duration video signal caused by movement of the beam over an object image, and means responsive to said position-indicating signal for applying a signal to said scanning means to shift the center of the spiral scan toward the target image by a distance substantially equal to the distance between lines of the spiral.

References Cited in the file of this patent

UNITED STATES PATENTS

| | | |
|---|---|---|
| 2,491,684 | Munster | Dec. 20, 1949 |
| 2,779,817 | Stahl | Jan. 29, 1957 |
| 2,798,115 | Wiens | July 2, 1957 |
| 2,807,750 | Hobbs | Sept. 24, 1957 |
| 2,838,602 | Sprick | June 10, 1958 |